3,321,470
5-ARYLIDENE-2-AMINO-2-OXAZOLIN-4-ONES
Charles Frederick Howell, New City, N.Y., Robert Allis Hardy, Jr., Ridgewood, N.J., and Nicanor Quinones Quinones, New York, N.Y., assignors to American Cyanamid Company, Stamford, Conn., a corporation of Maine
No Drawing. Filed Apr. 27, 1964, Ser. No. 362,980
7 Claims. (Cl. 260—240)

This invention relates to new 5-arylidene-2-amino-2-oxazoline-4-ones of the formula:

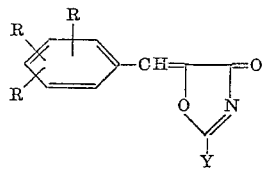

wherein R is a member of the group consisting of hydrogen, hydroxy, lower acyloxy, lower alkyl, lower alkoxy, halogen and trifluoromethyl; Y is a member of the group consisting of di-lower alkylamino, pyrrolidino, piperidino, morpholino and 4-lower alkyl-1-piperazino; and the non-toxic acid addition salts thereof. Suitable lower alkyl substituents contemplated by the present invention are those having from 1 to 6 carbon atoms such as methyl, ethyl, n-propyl, isopropyl, etc. Halogen is exemplified by chlorine and bromine.

The compounds of this invention are, in general, white crystalline solids, only very slightly soluble in water. They are weakly basic substances soluble in concentrated aqueous mineral acids at room temperature and in some cases form isolable acid addition salts. By virtue of the 5-arylidene double bond, these compounds may exist as cis and trans stereoisomers. It is to be understood that the present invention includes within its scope all such stereoisomeric forms.

The new compounds of this invention have valuable pharmaceutical properties. They are useful central nervous system depressants and in particular, they show depressant action of the tranquilizer-muscle relaxant type. This activity is demonstrated in several ways. A useful tranquilizer test consists in measuring the reduction of spontaneous motor activity in animals. For example, the active compounds of this invention are administered intraperitoneally at graded dose levels to groups of five mice. At the time of peak effect, each group of mice is placed in an actophotometer (a photoelectric device for quantitatively measuring locomotor activity) for a period of five minutes. Parallel control groups of five mice are given starch vehicle and their activity is also determined in a similar fashion. The average motor activity of the treated and control groups is compared and the percent reduction of motor activity due to the active agent is calculated. If desired, the dose which produces a 50% reduction in motor activity may also be calculated from the results of several different dose levels. The use of reduced motor activity as a measure of tranquilizing activity has been described by W. D. Gray, A. C. Osterberg and C. E. Rauh, Archives Internationales de Pharmacodynamie et de Therapie, vol. 134, p. 198 (1961) and by W. J. Kinnard and C. J. Carr, Journal of Pharmacology and Experimental Therapeutics, vol. 121, p. 354 (1957).

A test which is designed to demonstrate muscle relaxant properties consists in measuring the ability of animals to remain on an inclined screen. Groups of ten mice or rats are given intraperitoneal doses of the new compounds at three or more graded dose levels. The animals are placed on a ¼ inch wire mesh screen inclined at a 60° angle immediately after receiving the compound. This is a modification of the method reported by M. G. Allmark and W. M. Bachinski, Journal of the American Pharmaceutical Association, vol. 38, p. 43 (1949). The animals are observed for 20 minutes or longer and the proportions of animals falling off the screen at each dose level are recorded. The dose which produces this effect in 50% of the animals is calculated ($IS_{50}$). The use of an inclined screen test as a measure of muscle relaxant activity has been described by L. O. Randall, Diseases of the Nervous System, vol. 21 (March Supplement), p. 7 (1960). When the new compounds of this invention are tested in mice as described above, they show good muscle relaxant activity at non-toxic doses.

In addition, the compounds of this invention show other valuable pharmaceutical properties such as diuretic activity.

The compounds of this invention may be used in the form of their free bases or as the non-toxic acid addition salts such as the hydrochloride, sulfate, phosphate, etc. The compounds may be administered orally or parenterally and when so administered are active pharmaceutical agents as demonstrated in the test systems described above. For therapeutic administration, the new compounds may be incorporated with pharmaceutical excipients and used, for instance, in the form of tablets, dragees, capsules, suppositories, liquids to be administered in drops, emulsions, suspensions, syrups, chocolate, candy, chewing gum, and the like. Tablets, pills, dragees, and the like may contain the following: a binder such as gum tragacanth, acacia, corn starch or gelatin; a disintegrating agent such as corn starch, potato starch, alginic acid, or the like; a lubricant such as stearic acid, magnesium stearate, talc, or the like; and a sweetening agent such as sucrose or saccharin may be added, as well as flavoring such as peppermint, oil of wintergreen or cherry flavoring.

The new 5-arylidene-2-amino-2-oxazolin-4-ones of this invention may be prepared by several different routes, which also form a part of this invention. A preferred route is illustrated by the following:

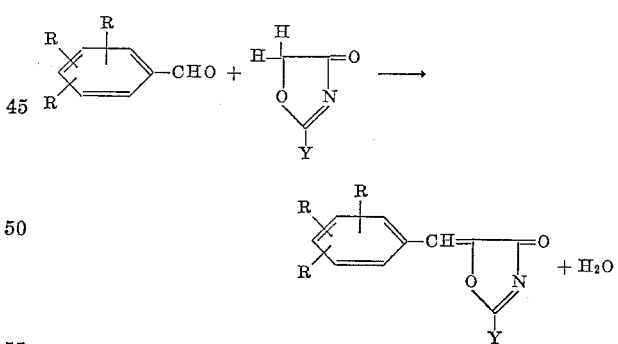

wherein R and Y are as previously defined. By this method, an aromatic aldehyde is condensed with a 2-amino-2-oxazolin-4-one derivative in the presence of a catalyst. A preferred method is the condensation under the influence of an aliphatic acid anhydride in the presence of an alkali or alkaline earth metal salt of the organic acid. Suitable anhydrides include acetic, propionic and the like and suitable salts include sodium acetate, sodium propionate, lithium acetate, calcium acetate and the like. An inert solvent and diluent is desirably used to maintain a suitable reaction temperature at the reflux temperature of the solvent. Additionally, the solvent may assist in separating the water formed in the reaction. Suitable solvents include benzene, toluene, heptane and the like. The temperature range is not critical; the range from about 50° to 200° C. is generally used.

Another method for preparing the new compounds of this invention is illustrated as follows:

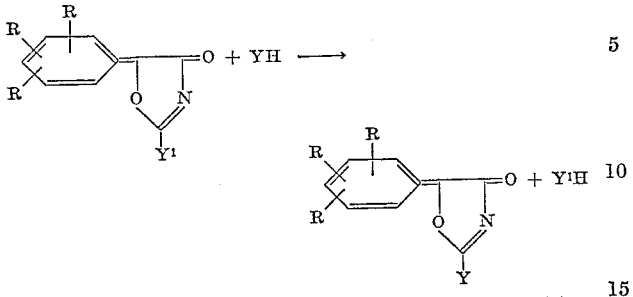

wherein R and Y are as previously described, and $Y^1$ is a di-lower alkylamino, pyrrolidino, piperidino, morpholino or 4-lower alkyl-1-piperazino group different from Y.

The reaction is generally carried out using an excess of YH to insure substantial completion of the exchange reaction. The displaced amine $Y^1H$ is generally a volatile amine which can be removed from the reaction mixture by heating. A temperature range from about 50° to 150° C. is commonly used. The reaction may be carried out with or without a solvent such as ethanol, propanol, butanol and the like. A catalyst may be used, or the reaction may be run in the absence of a catalyst. Suitable catalysts include ammonium chloride, ammonium acetate and the like.

The invention will be described in greater detail in conjunction with the following specific examples.

EXAMPLE 1

Preparation of 2-dimethylamino-2-oxazolin-4-one

A mixture of 21 grams of freshly distilled ethyl glycolate and 12 grams of dimethyl cyanamide with 300 milliliters of benzene is heated and about half of the benzene is distilled. The residual solution is treated cautiously with 0.2 gram of 50% sodium hydride dispersion in mineral oil, refluxed for several hours and allowed to stand overnight. Most of the solvent is removed by distillation and the residue is taken up in 200 milliliters of hot acetone and filtered. The filtrate is concentrated to about 50 milliliters and diluted with about 3 volumes of petroleum ether. The product precipitates and is collected; yield 13 grams, melting point 108–109.5° C. After purification by sublimation in vacuo, the product melts at 109–11° C., is readily soluble in water and shows a characteristic ultraviolet absorption band at $\lambda_{max.}^{MeOH}$ 227 millimicrons Alternately, a mixture of 50 grams of isopropyl glycolate, 30 grams of dimethylcyanamide with 300 milliliters of benzene is reacted in a similar manner. About 200 milliliters of benzene are distilled, the residue is treated with 1 gram of 50% sodium hydride dispersion, and the mixture is refluxed for about 20 hours. The product is isolated as described above.

EXAMPLE 2

Preparation of 5-benzylidene-2-dimethylamino-2-oxazolin-4-one

A mixture of 25.6 grams of 2-dimethylamino-2-oxazolin-4-one, 20 grams of sodium propionate, 40 milliliters of benzaldehyde, 100 milliliters of propionic anhydride and 200 milliliters of toluene is distilled until about 80 milliliters of distillate is collected. The residue is heated under reflux for about 6 hours and the resulting homogeneous solution is concentrated by evaporation under reduced pressure. The residue is dissolved in 200 milliliters of methylene chloride and washed successively with 100 milliliters of 10% sodium hydroxide, 50 milliliters of water, 25 milliliters of saturated sodium bisulfite, 50 milliliters of water and then dried over magnesium sulfate. The solvent is evaporated and the residual mixture of solid and oil is triturated with ether. The product precipitates and is collected; about 14 grams, melting point 175–177° C., is thereby obtained.

If desired, this material may be purified by recrystallization from ethyl acetate and sublimation in vacuo and pure product, melting point 181–182° C., is obtained. This material shows characteristic ultraviolet absorption bands at $\lambda_{max.}^{CH_3OH}$ 307 millimicrons

EXAMPLE 3

Preparation of 5-benzylidene-2-dimethylamino-2-oxazolin-4-one

A mixture of 3.8 grams of 2-dimethylamino-2-oxazolin-4-one, 2.4 grams of sodium acetate, and 30 milliliters of acetic anhydride is heated under reflux for about 16 hours. The mixture is concentrated under reduced pressure and the residue is added to 60 milliliters of 1 N sodium hydroxide. The crude product precipitates as a semi-solid, is separated and is suspended in about 60 milliliters of 10% hydrochloric acid and brought into solution by the gradual addition of concentrated hydrochloric acid. This aqueous solution is washed with ether and adjusted to about pH 9 by the addition of potassium carbonate and/or potassium hydroxide. The crude product is collected and purified as described in Example 2. It melts at 176–178° C.

EXAMPLE 4

Preparation of 5-(o-chlorobenzylidene)-2-dimethylamino-2-oxazolin-4-one

The general procedure of Example 2 is repeated. A mixture of 14 grams of o-chlorobenzaldehyde, 6.4 grams of 2-dimethylamino-2-oxazolin-4-one, 4.1 grams of sodium propionate, 25 milliters of propionic anhydride and 25 milliliters of toluene is refluxed for about 16 hours. The mixture is concentrated under reduced pressure and the residue is treated with a solution of 20 grams in potassium carbonate in 150 milliliters of water. The crude product precipitates, is collected and is recrystallized from acetone to give purified product melting at 210–212° C.

EXAMPLE 5

Preparation of 5-(m-chlorobenzylidene)-2-dimethylamino-2-oxazolin-4-one

The procedure of Example 4 is repeated substituting an equivalent amount of m-chlorobenzaldehyde for the o-chlorobenzaldehyde. The reaction proceeds smoothly and the product melts at 177–179° C. when recrystallized from benzene.

EXAMPLE 6

Preparation of 5-(p-chlorobenzylidene)-2-dimethylamino-2-oxazolin-4-one

The procedure of Example 4 is repeated substituting an equivalent amount of p-chlorobenzaldehyde for the o-chlorobenzaldehyde. The reaction proceeds smoothly and the product melts at 206–207° C. when recrystallized from aqueous dimethylformamide.

EXAMPLE 7

Preparation of 5-(o-propionyloxybenzylidene)-2-dimethyl-amino-2-oxazolin-4-one

The procedure of Example 4 is repeated substituting an equivalent amount of salicylaldehyde for the o-chlorobenzaldehyde. The reaction proceeds smoothly and the product melts at 152–154° C. when recrystallized from acetone.

EXAMPLE 8

Preparation of 5-(o-hydroxybenzylidene)-2-dimethylamino-2-oxazolin-4-one

A mixture of 2.5 grams of 5-(o-propionyloxybenzylidene)-2-dimethylamino-2-oxazolin-4-one and 10 milliliters of aniline is heated on a steam bath for about 22 hours. The solution is concentrated under reduced pressure and the residue is triturated with 40 milliliters of acetone. The crude product is collected and melts at 281–282° C. when recrystallized from ethanol.

EXAMPLE 9
*Preparation of 5-(p-methoxybenzylidene)-2-dimethylamino-2-oxazolin-4-one*

The procedure of Example 4 is repeated substituting an equivalent amount of p-anisaldehyde for the o-chlorobenzaldehyde. The reaction proceeds smoothly and the product melts at 195–196° C. when recrystallized from acetone.

EXAMPLE 10
*Preparation of 5-(3-methoxy-4-propionyloxybenzylidene-2-dimethylamino-2-oxazolin-4-one*

The procedure of Example 4 is repeated substituting an equivalent amount of 4-hydroxy-3-methoxybenzaldehyde for the o-chlorobenzaldehyde. The reaction proceeds smoothly and the product melts at 158–160° C. when recrystallized from water.

EXAMPLE 11
*Preparation of 5-(4-hydroxy-3-methoxybenzylidene)-2-dimethylamino-2-oxazolin-4-one*

A mixture of 3.2 grams of 5-(3-methoxy-4-propionyloxybenzylidene) - 2-dimethylamino-2-oxazolin-4-one and 15 milliliters of a aniline is heated at about 100° C. for about 22 hours. The crude product preciptates on cooling, is collected and is purified by recrystallization from aqueous dimethylformamide or by dissolving in aqueous potassium hydroxide and re-precipitation with acetic acid. When purified in this manner the product melts above 300° C.

EXAMPLE 12
*Preparation of 5-(3,4,5-trimethoxybenzylidene)-2-dimethylamino-2-oxazolin-4-one*

The procedure of Example 4 is repeated substituting an equivalent amount of 3,4,5-trimethoxybenzaldehyde for the o-chlorobenzaldehyde. The reaction proceeds smoothly and the product melts at 211–212° C. when recrystallized from aqueous dimethylformamide.

EXAMPLE 13
*Preparation of 5-(p-chlorobenzylidene)-2-(4-methyl-1-piperazino)-2-oxazolin-4-one*

A mixture of 2.5 grams of 5-(p-chlorobenzylidene)-2-dimethylamino-2-oxazolin-4-one and 10 milliliters of 1-methylpiperazine in 20 milliliters of ethanol is heated on the steam bath for about 6 hours and then diluted with 100 milliliters of ether. The crude product separates, is collected and recrystallized from acetone to yield purified product, melting point 220–221° C., which shows a characteristic ultraviolet absorption band at $$\lambda_{max.}^{CH_3OH}\ 300\ millimicrons$$

EXAMPLE 14
*Preparation of 5-(p-chlorobenzylidene-2-morpholino-2-oxazolin-4-one*

The procedure of Example 13 is repeated substituting an equivalent amount of morpholine for the 1-methylpiperazine. The reaction proceeds smoothly and the product melts at 290–291° C.

EXAMPLE 15
*Preparation of 5-(m-chlorobenzylidene)-2-(4-methyl-1-piperazino)-2-oxazolin-4-one*

The procedure of Example 13 is repeated substituting an equivalent amount of 5-(m-chlorobenzylidene)-2-dimethylamino-2-oxazolin-4-one for the 5-(p-chlorobenzylidene)-2-dimethylamino-2-oxazolin-4-one. The reaction proceeds smoothly and the product melts at 165–166° C. when recrystallized from aqueous acetone and shows a characteristic ultraviolet absorption band at $$\lambda_{max.}^{CH_3OH}\ 295\ millimicrons$$

EXAMPLE 16
*Preparation of 6-(o-chlorobenzylidene)-2-(-4-methyl-1-piperazino)-2-oxazolin-4-one*

A mixture of 2.5 grams of 5-(o-chlorobenzylidene)-2-dimethylamino-2-oxazolin-4-one and 6 grams of 1-methylpiperazine in 40 milliliters of acetone is heated on a steam bath for about one hour. The solution is concentrated and the residue is triturated with about 100 milliliters of ether whereupon the crude product separates and is collected. After purification by recrystallization from acetone the product melts at 196–198° C.

EXAMPLE 17
*Preparation of 5-(o-chlorobenzylidene)-2-morpholino-2-oxazolin-4-one*

The procedure of Example 16 is repeated substituting an equivalent amount of morpholine for the 1-methylpiperazine. The reaction proceeds smoothly and the product melts at 245–246° C. when recrystallized from chloroform by the addition of ether.

EXAMPLE 18
*Preparation of 5-(p-ethoxybenzylidene)-2-dimethylamino-2-oxazolin-4-one*

The procedure of Example 2 is repeated substituting an equivalent amount of p-ethoxybenzaldehyde for the benzaldehyde. When, in about 2 to 24 hours, the ultraviolet extinction coefficient at about 300–310 m$\mu$ is no longer increasing, the mixture is concentrated nearly to dryness and the product is purified as described in Example 2.

EXAMPLE 19
*Preparation of 5-(p-bromobenzylidene)-2-dimethylamino-2-oxazolin-4-one*

The procedure of Example 2 is repeated substituting an equivalent amount of p-bromobenzaldehyde for the benzaldehyde. When, in about 2 to 24 hours, the ultraviolet extinction coefficient at about 300–310 m$\mu$ is no longer increasing, the mixture is concentrated nearly to dryness and the product is purified as described in Example 2.

EXAMPLE 20
*Preparation of 5-(m-ethylbenzylidene)-2-dimethylamino-2-oxazolin-4-one*

The procedure of Example 2 is repeated substituting an equivalent amount of m-ethylbenzaldehyde for the benzaldehyde. When, in about 2 to 24 hours, the ultraviolet extinction coefficient at about 300–310 m$\mu$ is no longer increasing, the mixture is concentrated nearly to dryness and the product is purified as described in Example 2.

EXAMPLE 21
*Preparation of 5-(o-methylbenzylidene)-2-dimethylamino-2-oxazolin-4-one*

The procedure of Example 2 is repeated substituting an equivalent amount of o-tolualdehyde for the benzaldehyde. When, in about 2 to 24 hours, the ultraviolet extinction coefficient at about 300–310 m$\mu$ is no longer increasing, the mixture is concentrated nearly to dryness and the product is purified as described in Example 2.

EXAMPLE 22
*Preparation of 5-(m-trifluoromethylbenzylidene)-2-dimethylamino-2-oxazolin-4-one*

The procedure of Example 2 is repeated substituting an equivalent amount of m-trifluoromethylbenzaldehyde for the benzaldehyde. When, in about 2 to 24 hours, the ultraviolet extinction coefficient at about 300–310 mµ is no longer increasing, the mixture is concentrated nearly to dryness and the product is purified as described in Example 2.

EXAMPLE 23
*Preparation of 5-benzylidene-2-piperidino-2-oxazolin-4-one*

A mixture of 5-benzylidene-2-dimethylamino-2-oxazolin-4-one and piperidine in ethanol is heated under reflux for about 6 hours or until dimethylamine is no longer evolved. The solution is diluted with ether to precipitate the product which is then purified by recrystallization.

EXAMPLE 24
*Preparation of 5-benzylidene-2-di-n-propylamino-2-oxazolin-4-one*

The procedure of Example 23 is repeated substituting an equivalent volume of di-n-propylamine for the piperidine. The product is precipitated with ether and purified by recrystallization.

EXAMPLE 25
*Preparation of 5-benzylidene-2-pyrrolidino-2-oxazolin-4-one*

The procedure of Example 23 is repeated substituting an equivalent volume of pyrrolidine for the piperidine. The product is precipitated with ether and purified by recrystallization.

We claim:
1. A compound selected from the group consisting of 5-arylidene-2-amino-2-oxazoline-4-ones of the formula:

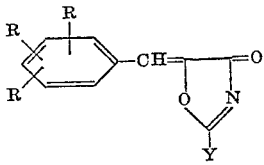

wherein R is a member of the group consisting of hydrogen, hydroxy, lower acyloxy, lower alkyl, lower alkoxy, halogen and trifluoromethyl; Y is a member of the group consisting of di-lower alkylamino, pyrrolidino, piperidino, morpholino and 4-lower alkyl-1-piperazino; and the non-toxic acid addition salts thereof.

2. 5-benzylidene-2-dimethylamino-2-oxazolin-4-one.
3. 5 - (m - chlorobenzylidene) - 2 - (4 - methyl - 1-piperazino)-2-oxazolin-4-one.
4. 5 - (p - chlorobenzylidene) - 2 - (4 - methyl - 1-piperazino)-2-oxazolin-4-one.
5. 5 - (o - chlorobenzylidene) - 2 - dimethylamino-2-oxazolin-4-one.
6. 5 - (o - chlorobenzylidene) - 2 - (4 - methyl - 1-piperazino)-2-oxazolin-4-one.
7. 5 - (3,4,5 - trimethoxybenzylidene) - 2 - dimethylamino-2-oxazolin-4-one.

References Cited by the Examiner

UNITED STATES PATENTS 3,037,990    6/1962    Hardy et al. _____ 260—307.1

OTHER REFERENCES

Houben-Weyl; Methoden der Organischen Chemie, 4th ed., Band XI/1, pages 248 to 255, George Thieme Verlag, Stuttgart, Germany (1957).
Chemical Abstracts I, vol 32, cols. 3396 to 3397 (1932).
Chemical Abstracts II, vol. 33, cols. 8198 to 8200 (1939).
Chemical Abstracts III, vol. 50, col. 12027 (1956).
Chemical Abstracts IV, vol. 54, cols. 24630 to 24631 (1960).

JOHN D. RANDOLPH, *Primary Examiner.*